(12) United States Patent
Lee et al.

(10) Patent No.: US 9,893,991 B2
(45) Date of Patent: Feb. 13, 2018

(54) DEVICE AND METHOD FOR PROCESSING DATA IN CONTENT TRANSMISSION SYSTEM

(71) Applicant: SK Telecom Co., Ltd., Seoul (KR)

(72) Inventors: Jongmin Lee, Seongnam-si (KR); Kyungjun Lee, Seongnam-si (KR); Yonghwan Ho, Incheon (KR)

(73) Assignee: SK Telecom Co., Ltd., Seoul (KR)

(*) Notice: Subject to any disclaimer, the term of this patent is extended or adjusted under 35 U.S.C. 154(b) by 274 days.

(21) Appl. No.: 14/797,638

(22) Filed: Jul. 13, 2015

(65) Prior Publication Data

US 2015/0319087 A1    Nov. 5, 2015

Related U.S. Application Data

(63) Continuation of application No. PCT/KR2014/004064, filed on May 8, 2014.

(30) Foreign Application Priority Data

Jun. 27, 2013   (KR) .................. 10-2013-0074373

(51) Int. Cl.
*H04L 12/28* (2006.01)
*H04L 12/741* (2013.01)
(Continued)

(52) U.S. Cl.
CPC .............. *H04L 45/74* (2013.01); *H04L 49/25* (2013.01); *H04L 67/2804* (2013.01);
(Continued)

(58) Field of Classification Search
CPC ......... H04L 45/50; H04L 63/20; H04L 45/22; H04L 12/4645
See application file for complete search history.

(56) References Cited

U.S. PATENT DOCUMENTS 6,438,123 B1 * 8/2002 Chapman ............ H04L 12/2801
370/351
6,574,214 B1 * 6/2003 Khalil .................. H04W 80/04
370/349

(Continued)

FOREIGN PATENT DOCUMENTS

CN            1757210 A     4/2006
CN          101124548 A     2/2008
(Continued)

OTHER PUBLICATIONS

International Search Report dated Aug. 26, 2014 for PCT/KR2014/004064.
(Continued)

*Primary Examiner* — Melanie Jagannathan
(74) *Attorney, Agent, or Firm* — Hauptman Ham, LLP

(57) ABSTRACT

A switching device for data processing includes: a processor unit to generate a pseudo-first-form packet by attaching a second-form header to an end portion of a first-form packet when a second-form packet is input, the second-form packet including the first-form packet encapsulated with the second-form header; and a switching unit to transfer the second-form packet to the processor unit when the second-form packet is input from a network, and transfer the pseudo-first-form packet generated by the processor unit to a cache device such that the cache device processes the pseudo-first-form packet.

11 Claims, 8 Drawing Sheets

(51) Int. Cl.
*H04L 12/947* (2013.01)
*H04L 29/08* (2006.01)
*H04L 29/06* (2006.01)

(52) U.S. Cl.
CPC .......... *H04L 67/2842* (2013.01); *H04L 69/16* (2013.01); *H04L 69/22* (2013.01)

(56) References Cited

U.S. PATENT DOCUMENTS

| | | | |
|---|---|---|---|
| 7,424,019 B1 | 9/2008 | Kopelman et al. | |
| 2005/0078704 A1* | 4/2005 | Anderson | H04L 69/08 370/466 |
| 2006/0104268 A1* | 5/2006 | Lee | H04L 45/00 370/389 |
| 2006/0117139 A1 | 6/2006 | Kobayashi et al. | |
| 2010/0169535 A1* | 7/2010 | Saxby | G06F 1/3209 710/316 |
| 2010/0265950 A1 | 10/2010 | Foxworthy et al. | |
| 2012/0176936 A1* | 7/2012 | Wu | H04W 8/26 370/254 |
| 2014/0233564 A1* | 8/2014 | Lue | H04L 45/50 370/392 |

FOREIGN PATENT DOCUMENTS

| | | |
|---|---|---|
| CN | 101828362 A | 9/2010 |
| KR | 1020060096012 A | 9/2006 |
| KR | 1020100015790 A | 2/2010 |
| KR | 1020100072352 A | 6/2010 |
| WO | 2012111222 A1 | 8/2012 |
| WO | 2013030693 A1 | 3/2013 |
| WO | 2013050079 A1 | 4/2013 |

OTHER PUBLICATIONS

Chinese Office Action dated May 2, 2017 in connection with the counterpart Chinese Patent Application No. 201480010360.8.

* cited by examiner

First-Form Packet:

| First-Form Header | Payload |

Second-Form Packet:

| Second-Form Header | First-Form Header | Payload |

Pseudo-First-Form Packet

| First-Form Header | Payload | Second-Form Header |

DEVICE AND METHOD FOR PROCESSING DATA IN CONTENT TRANSMISSION SYSTEM

CROSS-REFERENCE TO RELATED APPLICATIONS

The present application is a continuation of International Application No. PCT/KR2014/004064 filed on May 8, 2014, which is based on, and claims priority from Korean Patent Application No. 10-2013-0074373 filed in the Korean Intellectual Property Office on Jun. 27, 2013. The disclosures of the above-listed applications are hereby incorporated by reference herein in their entirety.

TECHNICAL FIELD

The present disclosure relates to content transmission technology, and more particularly, to a device for enabling a cache device to perform necessary processing on a packet input from a network to the cache device in a content transmission system and a method for the same.

BACKGROUND

The statements in this section merely provide background information related to the present disclosure and do not constitute prior art.

Lately, the performance of user equipment (UE), such as a smart phone, and mobile communication technology are rapidly being improved. Accordingly, a user has become able to access a web server provided by a content provider (CP) and use a variety of content, such as photographs, videos, audio, and applications, through UE at any time and any place. Also, the frequency of using content through a mobile network (e.g., a mobile communication network) in which the mobility of a user is ensured is continuously increasing.

However, while the number of web servers provided by a CP is limited, the number of users who access the web servers is rapidly increasing. For this reason, the inventor(s) has noted that there occur various needs related to improve communication resource and quality of service by reducing or, for example, data loss, a bottleneck, transmission delay, data discontinuity and data interruption. The inventor(s) has noted that to solve these needs, a content delivery network (CDN) has been provided.

A CDN is a service for stably transferring various types of content, such as photographs, movies, and music videos, to one or more UEs. More specifically, the CDN provides cache devices which are widely distributed to major points in a network. The inventor(s) has noted that these cache devices copy and store in advance a part or all of a variety of content, which is content having a large capacity, such as images, videos, and audio, or frequently requested by one or more UEs, present in web servers of a CP far away from the UEs. Subsequently, when a content request message is received from the UEs, a cache device located closest to the UE transmits content to the UEs. The inventor(s) has noted that the CDN improves content access speed and stably provides content.

SUMMARY

In accordance with some embodiments, a switching device for data processing comprises a processor unit and a switching unit. The processor unit is configured to generate a pseudo-first-form packet by attaching a second-form header to an end portion of a first-form packet when a second-form packet is input, the second-form packet including the first-form packet encapsulated with the second-form header. And the switching unit is configured to transfer the second-form packet to the processor unit when the second-form packet is input from a network, and transfer the pseudo-first-form packet generated by the processor unit to a cache device such that the cache device processes the pseudo-first-form packet.

In accordance with some embodiments, a method performed by a switching device for data processing, the switching device comprising a processor unit and a switching unit, the method comprises: generating a pseudo-first-form packet by attaching a second-form header to an end portion of a first-form packet when a second-form packet is input, the second-form packet including the first-form packet encapsulated with the second-form header; transferring the second-form packet to the processor unit when the second-form packet is input; and transferring the pseudo-first-form packet to a cache device such that the cache device processes the pseudo-first-form packet.

DETAILED DESCRIPTION

Figure 1:
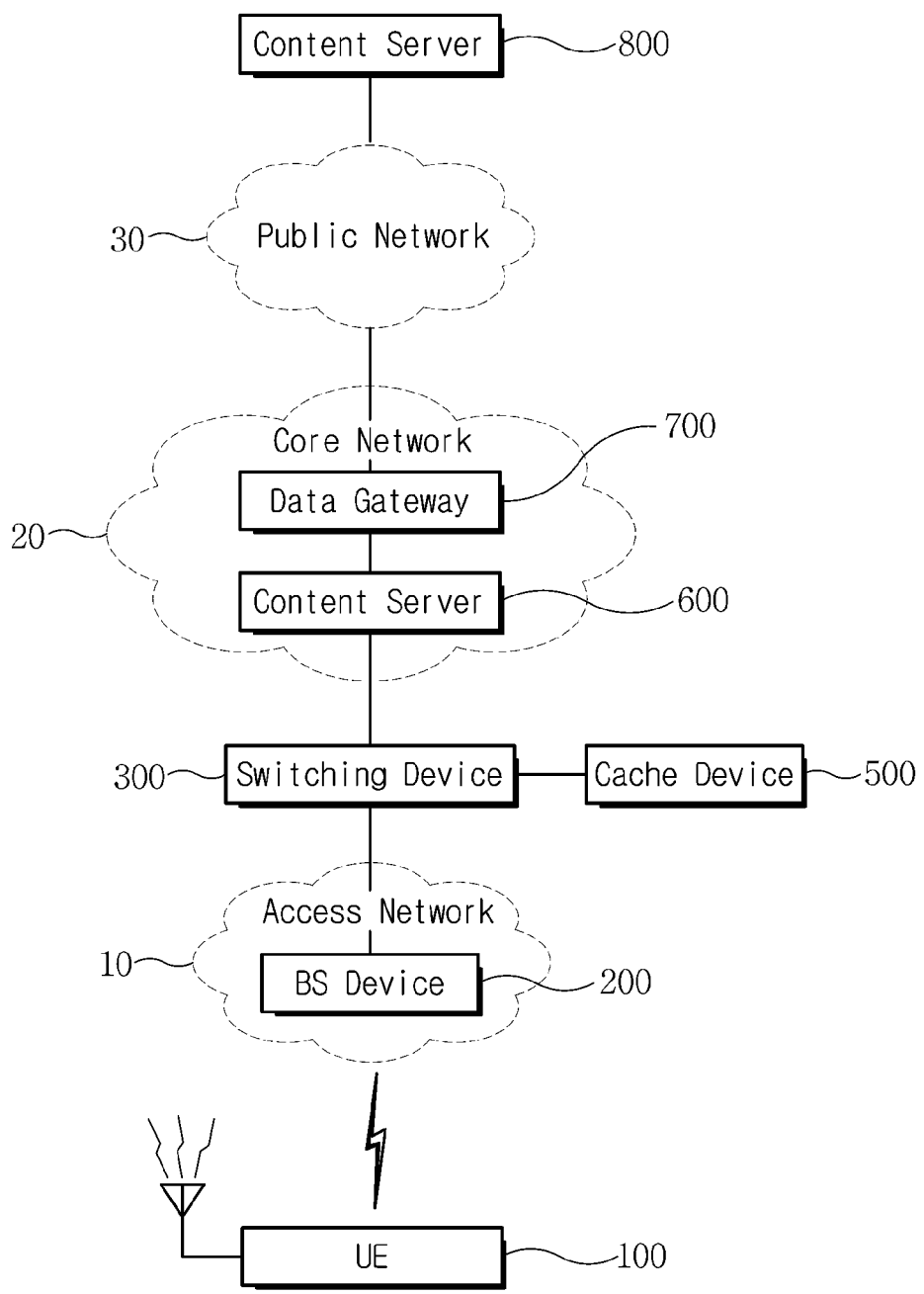
FIG. 1 is a diagram of a content transmission system according to exemplary embodiments of the present disclosure.

Hereinafter, exemplary embodiments that enable those of ordinary skill in the art of the present disclosure to implement some of embodiments the present disclosure will be described in detail with reference to the accompanying drawings. In the detailed description of exemplary embodiments of the present disclosure, when detailed descriptions of related known functions or elements are determined to unnecessarily obscure the gist of the present disclosure, the detailed descriptions will be omitted. This is intended not to obscure but to clearly deliver the core of the present disclosure by omitting unnecessary descriptions. Some embodiments of the present disclosure provide a device for data processing which enables a cache device to perform necessary processing in a content transmission system without damaging the information of an original packet input to the cache device, and a method for the same. In some embodiments of the present disclosure, a content transmission system is a system for providing a content delivery network (CDN) service, and a cache device transmits content to user equipment (UE) in replacement of a content server. To this end, the cache device requests and receives the content from the content server. Alternatively, the cache device receives, copies, and stores the content transmitted to the UE by the content server, as an intermediary. After that, the cache device transmits the content to the UE. However, a packet which is used to process transmission and reception of the content in a core network does not be recognized by the cache device. Therefore, a switching device of some embodiments of the present disclosure converts the packet into a form recognizable by the cache device, and then provides the converted packet to the cache device. Also, the cache device completes processing of the packet, for example, content copying and storing, and then provides the packet back to the switching device. Then, the switching device restores the packet to a form used in the core network, and then transmits the packet. As described above, some embodiments of the present disclosure makes it possible to modify an original packet input to a cache device into a packet recognizable by the cache device without damaging information of the original packet.

When an element is referred to as being "connected" or "coupled" to another element, it can be directly connected or coupled to the other element or intervening elements may be present. The terminology used in this specification is for the purpose of describing particular embodiments only and is not intended to be limiting of the disclosure. The singular forms "a," "an," and "the" are intended to include the plural forms as well, unless the context clearly indicates otherwise. The terms "comprises," "comprising," "includes," and "including," when used herein, specify the presence of stated features, numbers, steps, operations, elements, parts, or combinations thereof, but do not preclude the presence or addition of one or more other features, numbers, steps, operations, elements, parts, or combinations thereof.

The terms, such as "first" and "second," are used to describe various elements. The terms are merely used to distinguish one element from other elements, but are not used to limit the elements. Throughout the drawings, like numerals refer to portions that perform similar functions and exert similar effects, and duplicate descriptions of the portions will be omitted.

FIG. 1 is a diagram of a content transmission system according to exemplary embodiments of the present disclosure.

Referring to FIG. 1, a content transmission system according to embodiments of the present disclosure includes user equipment (UE) 100, a base station (BS) device 200, a switching device 300, a cache device 500, a serving gateway 600, a data gateway 700, and a content server 800.

The UE 100 accesses the content server 800 through an access network 10, a core network 20, and a public network 30. In other words, the UE 100 accesses the content server 800 through the BS device 200, the switching device 300, the serving gateway 600, and the data gateway 700. Here, it is to be noted that the switching device 300 is included in a path for the UE 100 to access the content server 800. The UE 100, as an exemplary embodiment of the present application, is a user terminal device such as a PC (personal computer), notebook computer, PDA (personal digital assistant), PMP (portable multimedia player), PSP (PlayStation Portable), wireless communication terminal, smart phone, network-connectable appliance such as TV and the like.

The access network 10 is a network including network entities which provide a wireless zone service in a cellular system. For example, the access network 10 is implemented by a plurality of BSs, such as a base transceiver station (BTS) and a node base station (NodeB), and a base station controller (BSC), such as a radio network controller (RNC). In another example, the access network 10 is implemented by one entity such as an evolved node base station (eNodeB). In still another example, the access network 10 comprises a digital unit (DU) and a radio unit (RU). The DU and the RU are configured by separating a digital signal processing unit and a wireless signal processing unit integrally implemented in a BS from each other. Here, a plurality of RUs are connected to one DU. Consequently, the BS device 200 is any one of the aforementioned configurations.

The core network 20 manages information on users who subscribe to a communication service, and performs circuit switching or packet switching. Also, the core network 20 manages inter-frequency mobility, and manages and controls traffic in the access network 10 and the core network 20 and interoperation with another network, for example, the public network 30. The core network 20 includes entities which perform the aforementioned functions. These entities are exemplified by a mobile switching center (MSC), a home location register (HLR), a mobile mobility entity (MME), a home subscriber server (HSS), and so on. In particular, the serving gateway 600 and the data gateway 700 may be the aforementioned entities of the core network 20. The serving gateway 600 processes traffic for a plurality of BS devices 200. Here, the serving gateway 600 may be a serving gateway (S-GW). The data gateway 700 processes traffic between the core network 20 to which the data gateway 700 belongs and a network (e.g., a public network) other than the core network 20 to which the data gateway 700 belongs. Such a data gateway 700 may be a packet data network gateway (P-GW). In embodiments of the present disclosure, entities in the core network 20 including the serving gateway 600, the data gateway 700, etc. are referred to as "core devices."

The public network 30 is a general open network in which information is exchanged according to transmission control protocol/Internet protocol (TCP/IP). Such a public network 30 is exemplified by the Internet which employs IP. In the public network 30, the content server 800 is located. The content server 800 is provided to store content and provide a variety of content to the UE 100 upon request. Here, content is exemplified by photographs, videos, audio, applications, and so on. The content server 800 is a server run by a so-called content provider (CP). The content server 800 may provide content to a plurality of pieces of UE 100. Such a content server 800 is exemplified by a web server, a web application server (WAS), and so on.

The UE 100 is provided to receive content from the content server 800 and play the content upon request of a user. For example, the UE 100 finds a uniform resource locator (URL) of content requested by a user. After that, the UE 100 may acquire address information (an IP address) of the content server 800 corresponding to the URL through a domain name system (DNS) or so on. Then, the UE 100 requests the content from the content server 800 corresponding to the address information. Accordingly, the UE 100 may receive the content transmitted by the content server 800.

The cache device 500 stores a part or all of a content copy provided by the content server 800. The cache device 500 is provided to provide stored content to the UE 100 in replacement of the content server 800 when there is a request of the UE 100. To this end, the cache device 500 is configured to receive the content request transmitted from the UE 100 to the content server 800, as an intermediary. Also, the cache device 500 may receive, copy, and then store content transmitted to the UE 100 by the content server 800, as an intermediary, or may receive content from the content server 800 and store the content in advance.

The content server 800, the UE 100, and the cache device 500 use first-form packets. Here, a first-form packet is a TCP/IP packet. The TCP/IP packet includes a TCP/IP header and a payload. On the other hand, the BS device 200, the serving gateway 600, and the data gateway 700 communicate with each other through tunneling. Packets used for such tunneling are second-form packets. A second-form packet is generated by encapsulating a first-form packet with a second-form header. Such a second-form header includes a general packet radio service tunneling protocol (GTP) header. More specifically, a second-form header includes, for example, an outer IP header for tunneling, a user datagram protocol (UDP) header, and a GTP header. Therefore, a second-form packet is a GTP packet obtained by attaching an outer IP header, a UDP header, and a GTP header in front of a TCP/IP header in the aforementioned first-form packet having the TCP/IP header and a payload.

To perform communication through tunneling, the BS device 200, the serving gateway 600, and the data gateway 700 use second-form packets. However, the UE 100 and the content server 800 do not process a second-form header. Therefore, the BS device 200 and the data gateway 700 perform the following operation. The BS device 200 encapsulates a first-form packet received from the UE 100 with a second-form header, thereby generating a second-form packet. Subsequently, the BS device 200 transfers the second-form packet to the serving gateway 600. Also, the BS device 200 removes a second-form header from a second-form packet received from the serving gateway 600, thereby restoring a first-form packet. After that, the BS device 200 transfers the first-form packet to the UE 100. Likewise, the data gateway 700 encapsulates a first-form packet received from the content server 800 with a second-form header, thereby generating a second-form packet. After that, the data gateway 700 transfers the generated second-form packet to the serving gateway 600. Also, the data gateway 700 removes a second-form header from a second-form packet received from the serving gateway 600, thereby restoring a first-form packet. After that, the data gateway 700 transfers the first-form packet to the content server 800. A second-form packet as described above is used to process traffic for data transmission and reception in a network, and is distinguished from a packet for audio.

Meanwhile, the switching device 300 is located between the access network 10 and the core network 20. The cache device 500 is connected to the switching device 300. The cache device 500, in some situations, is not configured to process or recognize a second-form header. In addition, as described above, the cache device 500 is configured to receive a packet transmitted from the content server 800 to the UE 100, as an intermediary. Further, the cache device 500 is configured to copy and store content included in the packet and then transmit the packet to the UE 100. Therefore, the switching device 300 and the cache device 500 are configured to receive a second-form packet from the content server 800, perform necessary processing on the second-form packet, and then transfer the second-form packet to the UE 100 in its entirety. Also, when content requested by the UE is determined as a cache hit, the cache device 500 is configured to directly transfer the stored content to the UE 100. In this case, the switching device 300 is configured to receive a second-form packet rather than a pseudo-first-form packet and then transfer the second-form packet to the UE 100.

Packets of all uplinks or downlinks of the access network 10 in which the switching device 300 is located pass through the switching device 300. Accordingly, the switching device 300 is configured, in some embodiments, to cause a packet which does not require processing by the cache device 500 to pass through the switching device 300.

Figures 2, 3:
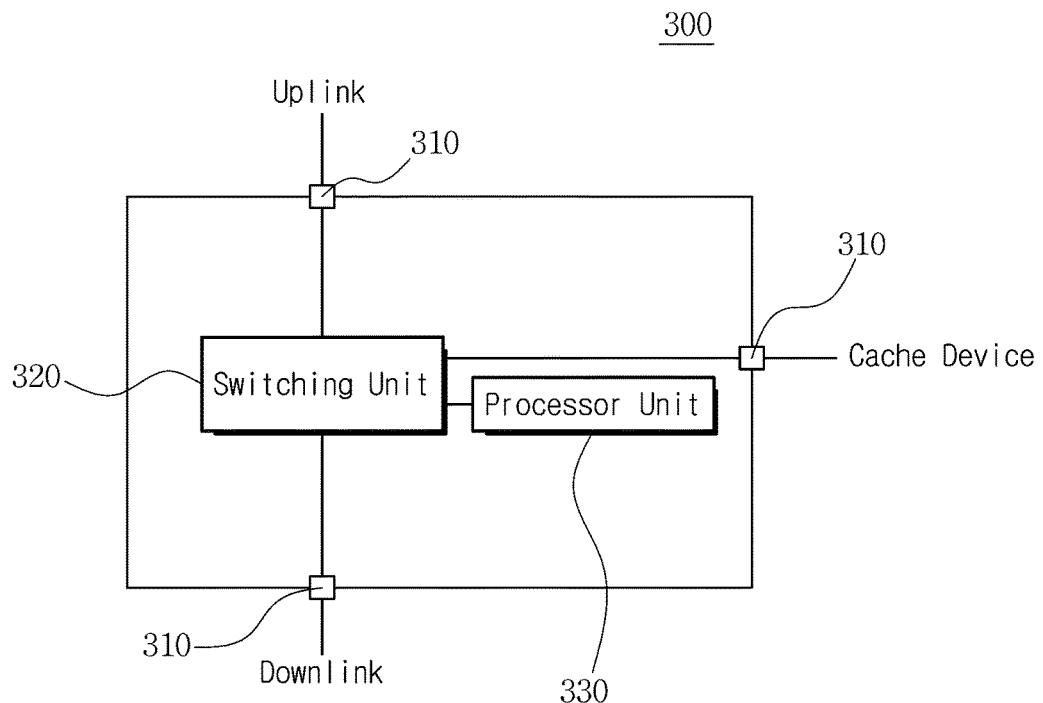
FIG. 2 is a block diagram of a configuration of a switching device in the content transmission system according to exemplary embodiments of the present disclosure.
FIG. 3 is a diagram of a pseudo-packet according to embodiments of the present disclosure.

Therefore, when a packet is input and the packet is a second-form packet for tunneling, the switching device 300 determines the packet as traffic for data transmission and reception. Then, the switching device 300 performs processing corresponding to the second-form packet. At this time, the switching device 300 processes the second-form packet to generate a packet of a form recognizable by the cache device 500 (a pseudo-first-form packet), and transfers the generated packet (i.e., a pseudo-first-form packet) to the cache device 500. The second-form packet has a structure in which a first-form packet is encapsulated with a second-form header. Therefore, the switching device 300 attaches a second-form header, for example, behind a first-form packet. In this way, a pseudo-first-form packet is generated. The pseudo-first-form packet has a first-form header at a beginning portion thereof, and thus is recognizable by the cache device 500. Also, the cache device 500 performs necessary processing on the pseudo-first-form packet. Such processing includes, for example, a cache hit determination, content copying and storing, and so on. After that, the cache device 500 transfers the pseudo-first-form packet back to the switching device 300. Then, the switching device 300 moves a second-form header of the pseudo-first-form packet from the rear to the front so as to restore the second-form packet (as shown in FIG. 3, presented as an exemplary embodiment of the present disclosure), and then transmits the restored second-form packet.

According to a result of a cache hit determination, the cache device 500 loads previously stored content in a second-form packet and transfer the second-form packet to the switching device 300. In this case, the switching device 300 causes the second-form packet transmitted from the cache device 500 to bypass the switching device 300, as it is. At this time, the second-form packet output from the cache device 500 is transmitted to the UE 100 which is the original destination.

As described above, according to embodiments of the present disclosure, the switching device 300 can modify a packet provided to the cache device 500 into a packet recognizable by the cache device 500 without damaging information of the packet. Accordingly, the cache device 500 can perform necessary processing on the packet.

In embodiments described below, it is assumed that the content server 800 transmits a packet to the UE 100. However, the present disclosure is not limited to this case, and exemplary embodiments of the present disclosure are applied to the case of uplink transmission in which the UE 100 transmits a packet to the content server 800 as well as such a case of downlink transmission. In other words, the switching device 300 is located between the BS device 200 and a core device (e.g., the serving gateway 600 and the data gateway 700), and receives all uplink or downlink packets between the BS device 200 and the core device. Accordingly, when an uplink or downlink packet corresponds to a second-form packet, the switching device 300 converts the second-form packet into a pseudo-first-form packet such that the cache device 500 recognizes the uplink or downlink packet, and provides the pseudo-first form packet to the cache device 500.

FIG. 2 is a block diagram of a configuration of a switching device in the content transmission system according to exemplary embodiments of the present disclosure, and FIG. 3 is a diagram of a pseudo-packet according to exemplary embodiments of the present disclosure.

Referring to FIGS. 2 and 3, the switching device 300 includes interface units 310, a switching unit 320, and a processor unit 330. Other components of the switching device 300, such as the interface units 310, the switching unit 320 and the processor unit 330 are implemented by one or more processors and/or application-specific integrated circuits (ASICs).

The interface units 310 include one or more hardware communication modules to transmit signals (e.g., instructions or controls to perform a content delivery (i.e., in a form of one or more packets) and a plurality of different interfaces between the cache device 500, the BS device 200 and contents server 600) to network entities (e.g., the cache device 500, the access network 10 and contents server 600) and/or receive signals from the network entities. The interface units 310 are entities on paths through which the interface units 310 transmits and received packets, and include one or more hardware communication modules (such as network adapters and/or antennas) to perform a plurality of interfaces. In other words, the interface units 310 transmit and received packets to and from the core device and the BS device. A packet received from an uplink or a downlink by the interface unit 310 is input to the switching unit 320. Also, a packet output from the switching unit 320 is transmitted to an uplink or a downlink through the interface unit 310. A particular packet is output from the switching unit 320 to the cache device 500 through the interface unit 310. Also, a packet is received from the cache device 500 through the interface unit 310.

The switching unit 320 is entity on a path through which the switching unit 320 transmits and receives an uplink or downlink packet through the interface unit 310. When an uplink or downlink packet is input through an interface unit 310, the switching unit 320 determines whether or not the input packet corresponds to a packet for transmission and reception of content (data). In other words, the switching unit 320 determines whether or not the input packet corresponds to a second-form packet by checking a second-form header included in the second-form packet. For example, when headers for tunneling (an outer IP header, a UDP header, and a GTP header) are included in the input packet, the switching unit 320 determines the input packet as a second-form packet. When the input packet is determined as a second-form packet, the switching unit 320 inputs the input packet to the processor unit 330. When the input packet is not determined as a second-form packet, the switching unit 320 causes the input packet to bypass the switching unit 320 and to be output, without changes, through the interface unit 310.

Subsequently, the switching unit 320 receives a pseudo-first-form packet obtained by attaching a second-form header behind a first-form packet in the second-form packet from the processor unit 330. That is, the processor unit 330 generates the pseudo-first-form packet in a manner that the processor unit 330 encapsulates a first-form packet with a second-form header by attaching the second-form header to the end of a first-form packet, as indicated in FIG. 3 of an exemplary embodiment of the present disclosure. Then, the switching unit 320 outputs the pseudo-first-form packet to the cache device 500. Meanwhile, the switching unit 320 receives a pseudo-first-form packet from the cache device 500. The switching unit 320 transfers the pseudo-first-form packet to the processor unit 330. Then, the switching unit 320 receives a second-form packet from the processor unit 330. The switching unit 320 transmits the second-form packet to an uplink or a downlink through the interface unit 310. Also, the switching unit 320 receives a second-form packet from the cache device 500. In this case, the switching unit 320 transmits the second-form packet received from the cache device 500 to a downlink, as it is without any process performed on the second-form packet.

The switching unit 320 transmits an operation check message received from the processor unit 330 to the cache device 500 through the interface unit 310. Also, the switching unit 320 transfers an operation response message received from the cache device 500 through the interface unit 310 to the processor unit 330. In particular, in case a fault occurs in the switching device 320 or the cache device 500 connected to the switching device 320, the switching unit 320 serves as an optical transmission line, i.e., all uplink packets or downlink packets passing through the switching unit 320 bypass the switching unit 320. Further, even when the power of the switching device 300 is off, the switching unit 320 serves as an optical transmission line. Therefore, even when the power of the switching device 300 is off, network traffic is not stopped (i.e., data transmission and data reception related to uplink packets or downlink packets to the switching device 300 are performed and maintained even when the power of the switching device 300 is off).

The processor unit 330 is provided for data processing. The processor unit 330 is typically exemplified by a network processor. The processor unit 330 converts a second-form packet into a pseudo-first-form packet. As shown in FIG. 3, a second-form packet has a structure in which a first-form packet is encapsulated with a second-form header. Therefore, when a second-form packet is input from the switching unit 320, the processor unit 330 attaches the second-form header behind the first-form packet to generate a pseudo-first-form packet. After that, the processor unit 330 outputs the pseudo-first-form packet to the switching unit 320. The cache device 500 reads the pseudo-first-form packet from a beginning portion of the pseudo-first-form packet. For this reason, the cache device 500 reads a first-form header of the pseudo-first-form packet. Accordingly, the cache device 500 handles the pseudo-first-form packet in the same way as a first-form packet. As a result, the cache device 500 performs necessary processing on the pseudo-first-form packet and transfer the pseudo-first-form packet back to the switching device 300. Then, the switching unit 320 transfers the pseudo-first-form packet to the processor unit 330. In this case, the processor unit 330 processes the pseudo-first-form packet to thereby restore the second-form packet. In other words, the processor unit 330 restores the second-form packet by moving the second-form header of the pseudo-first-form packet from the rear portion to the front portion in the pseudo-first-form packet. Accordingly, the second-form packet is restored. After that, the processor unit 330 transfers the second-form packet to the switching unit 320.

To determine whether or not the cache device 500 has broken down, the processor unit 330 periodically transfers an operation check message to the switching unit 320. Such an operation check message is exemplified by an address resolution protocol (ARP) request message, a ping test, a synchronization (SYN) packet to a particular TCP port, and so on. The switching unit 320 transmits the operation check message to the cache device 500 through the interface unit 310. Also, when the cache device 500 operates normally, the switching unit 320 receives an operation response message from the cache device 500 through the interface unit 310. When the operation response message is received from the switching unit 320, the processor unit 330 determines that the cache device 500 operates normally. On the other hand, when no operation response message is received within a pre-set time, the processor unit 330 recognizes a fault in the cache device 500. Meanwhile, when a fault occurs in the cache device 500, the cache device 500 shuts down the link with the switching device 300. Also, the processor unit 330 senses link down of the cache device 500 connected thereto. Accordingly, the processor unit 330 does not transmit any packet to the cache device 500 and controls the switching unit 320 to pass all packets.

Figure 4:
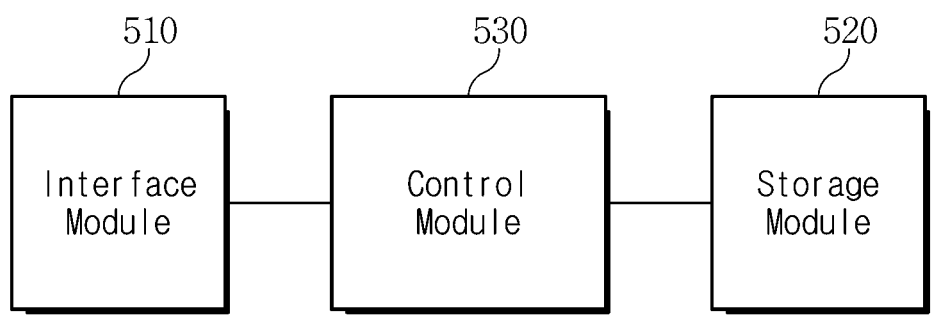
FIG. 4 is a block diagram of a configuration of a cache device in the content transmission system according to exemplary embodiments of the present disclosure.

FIG. 4 is a block diagram of a configuration of a cache device in the content transmission system according to exemplary embodiments of the present disclosure.

Referring to FIGS. 1 and 4, the cache device 500 includes an interface module 510, a storage module 520, and a control module 530. Other components of the cache device 500, such as the interface module 510 and a control module 530 are implemented by one or more processors and/or application-specific integrated circuits (ASICs). The interface module 510 include one or more hardware communication modules (as described herein) to transmit signals (e.g., instructions or controls to perform a content delivery (i.e., in a form of one or more packets) and a plurality of different interfaces between the switching device 300, the UE 100 and the content server 800) to network entities (e.g., the switching device 300, the UE 100 and the content server 800) and/or receive signals from the network entities. The storage module 520 comprises one or more non-transitory computer-readable recording medium.

The interface module 510 is provided to receive packets transmitted and received through the access network 10 or the core network 20 or transmit stored packets. In particular, the interface module 510 communicates with the UE 100 and the content server 800. To this end, the interface module 510 transmits and receives packets through the switching device 300. According to embodiments of the present disclosure, the interface module 510 receives a pseudo-first-form packet from the switching device 300. Also, the interface module 510 receives a first-form packet from the control module 530 and transfers the first-form packet to the switching device 300.

The storage module 520 has a storage space for storing content. In the storage space, a part or all of the copy of content stored in at least one content server 800 is stored. The control module 530 receives a packet transmitted from the content server 800 to the UE 100 through the interface module 510. Then, the control module 530 copies content of the received packet and stores the content in the storage module 520. Also, the control module 530 requests content from the content server 800 according to a pre-set policy, receives and stores the content when the content server 800 transmits a packet including the content.

Content stored in the storage space of the storage module is maintained or removed according to the frequency of request thereof. Content is stored in the storage space according to first-in first-out (FIFO) queuing. When there is a request for content but the content is not stored, the content is received from the original server, that is, the content server 800, and input to and stored in a queue. At this time, the storage space is in accordance with FIFO queuing. In this case, first-stored content is removed when there is not enough storage space to store new content. On the other hand, when there is a request for content and the content is stored in the storage space, the stored content is input again to the queue as if the content were stored again. In this way, content stored in the storage space is removed or maintained according to the frequency of request of the content.

The control module 530 is provided to control overall operation of the cache device 500. When a pseudo-first-form packet including content is received through the interface module 510, the control module 530 stores the content in the storage module 520. The control module 530 reads a packet from a beginning portion of the packet, and thus processes a pseudo-first-form packet in the same way as a first-form packet without processing a second-form header. At this time, when content is included in the pseudo-first-form packet, the control module 530 copies the content included in the pseudo-first-form packet and stores the content in the storage module 520.

The control module 530 then transfers the pseudo-first-form packet back to the switching device 300 through the interface module 510.

Meanwhile, when the pseudo-first-form packet is a content request message, the control module 530 determines whether content request by the pseudo-first-form packet is stored in the storage module 520. This is referred to as a cache hit determination. When a determination result indicates a cache hit, that is, when the requested content is stored in the storage module 520, the control module 530 retrieves the content stored in the storage module 520, load the content in a second-form packet, and transfer the second-form packet to the switching device 300. At this time, the second-form packet is configured like a packet transmitted from the content server 800 to the UE 100. Therefore, the second-form packet generated by the cache device 500 bypasses the switching device 300 and is directly transferred to the UE 100.

In particular, the control module 530 receives an operation check message through the interface module 510. Then, when the cache device 500 operates normally, the control module 530 transmits an operation response message providing a notification that the cache device 500 is operating normally to the switching device 300 through the interface module 510. On the other hand, when a fault in the cache device 500 is sensed, the control module 530 shuts down the link with the switching device 300 regardless of whether or not an operation check message is received. Accordingly, the switching device 300 recognizes a fault in the cache device 500.

Figure 5:
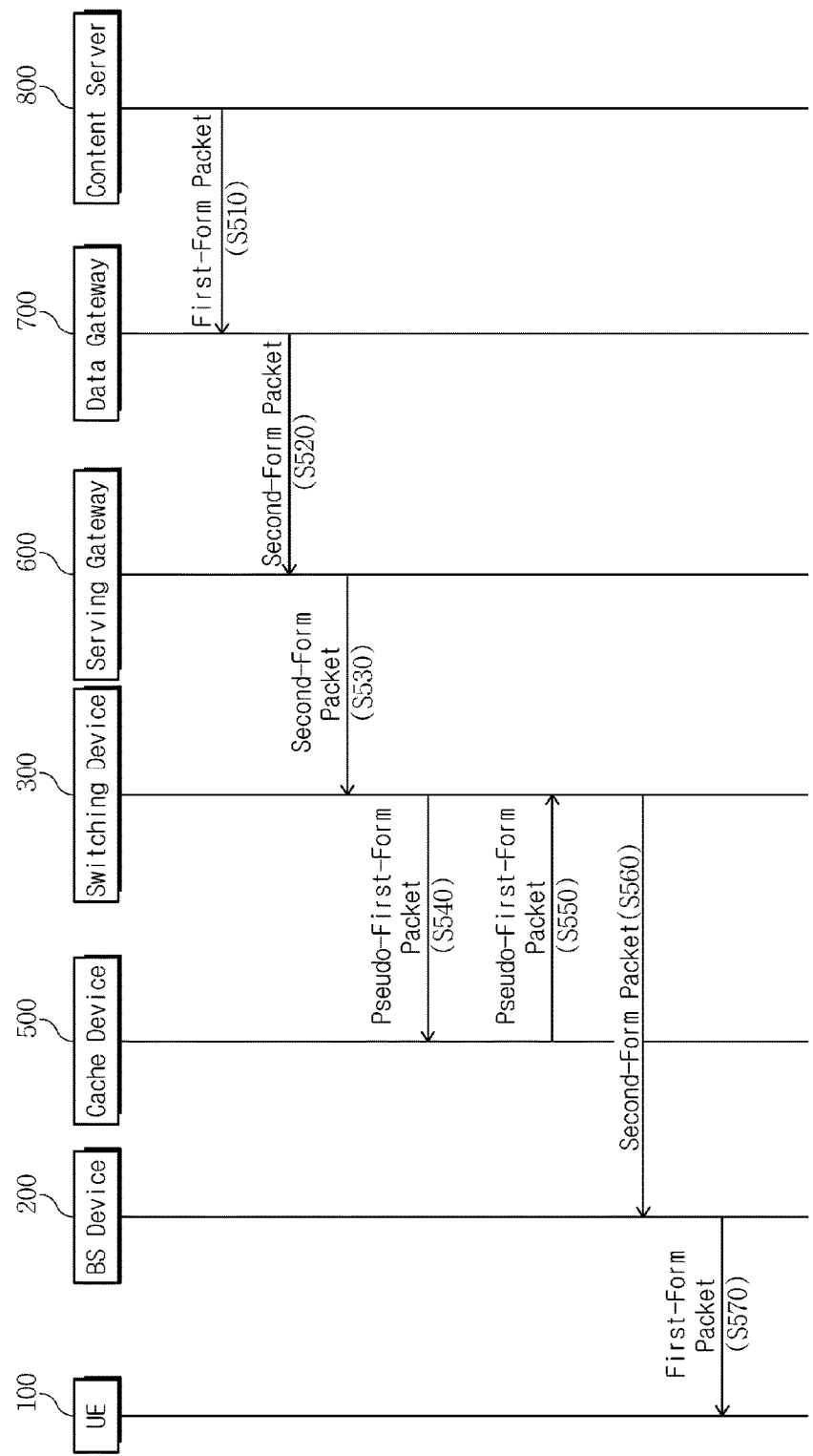
FIG. 5 is a flowchart of a data processing method according to exemplary embodiments of the present disclosure.

FIG. 5 is a flowchart of a data processing method according to exemplary embodiments of the present disclosure.

In FIG. 5, it is assumed that, during a process in which the content server 800 transmits content to the UE 100, the cache device 500 copies and stores the content.

Referring to FIGS. 3 and 5, in operation S510, the content server 800 transmits a first-form packet including content to the data gateway 700. The first-form packet includes a first-form header and a payload.

When the first-form packet is received, the data gateway 700 encapsulates the first-form packet with a second-form header to generate a second-form packet. This is provided for communication through tunneling. Here, values designating the serving gateway 600 are stored in a destination-related field of the second-form header. Therefore, when the data gateway 700 transmits the second-form packet in operation S520, the second-form packet is transferred to the serving gateway 600.

In operation S530, the serving gateway 600 designates a BS device 200 in the access network 10 with which the UE 100 has been registered as a destination in the second-form header, and transmits the second-form packet. When there is not the switching device 300, the second-form packet does not pass through the switching device 300 and is transferred to the BS device 200. However, the switching device 300 receives the second-form packet between the serving gateway 600 and the BS device 200.

The switching device 300 converts the second-form packet into a pseudo-first-form packet. The second-form packet is obtained by encapsulating the first-form packet with the second-form header. The switching device 300 attaches the second-form header behind the first-form packet to generate the pseudo-first-form packet. Subsequently, in operation S540, the switching device 300 transfers the pseudo-first-form packet to the cache device 500.

The cache device 500 reads the received packet from a beginning portion of the packet, and thus directly processes a first-form header in the pseudo-first-form packet without processing the second-form header. In at least one embodiment, the cache device 500 copies and stores the content included in the pseudo-first-form packet. In operation S550, the cache device 500 transfers the pseudo-first-form packet back to the switching device 300.

When the pseudo-first-form packet is transmitted as it is, entities in a network do not recognize the destination (BS device) included in the second-form header attached behind the first-form packet. Accordingly, the packet is lost. For this reason, the switching device 300 processes the pseudo-first-form packet to restore the second-form packet. After that, the switching device 300 transmits the second-form packet to the BS device 200 in operation S560.

When the second-form packet is received, the BS device 200 removes the second-form header from the second-form packet to restore the first-form packet. This is because, in some situations, the UE 100 is not configured to recognize the second-form packet. Next, in operation S570, the BS device 200 transmits the first-form packet to the UE 100. Accordingly, the UE 100 receives content through the first-form packet.

Figure 6:
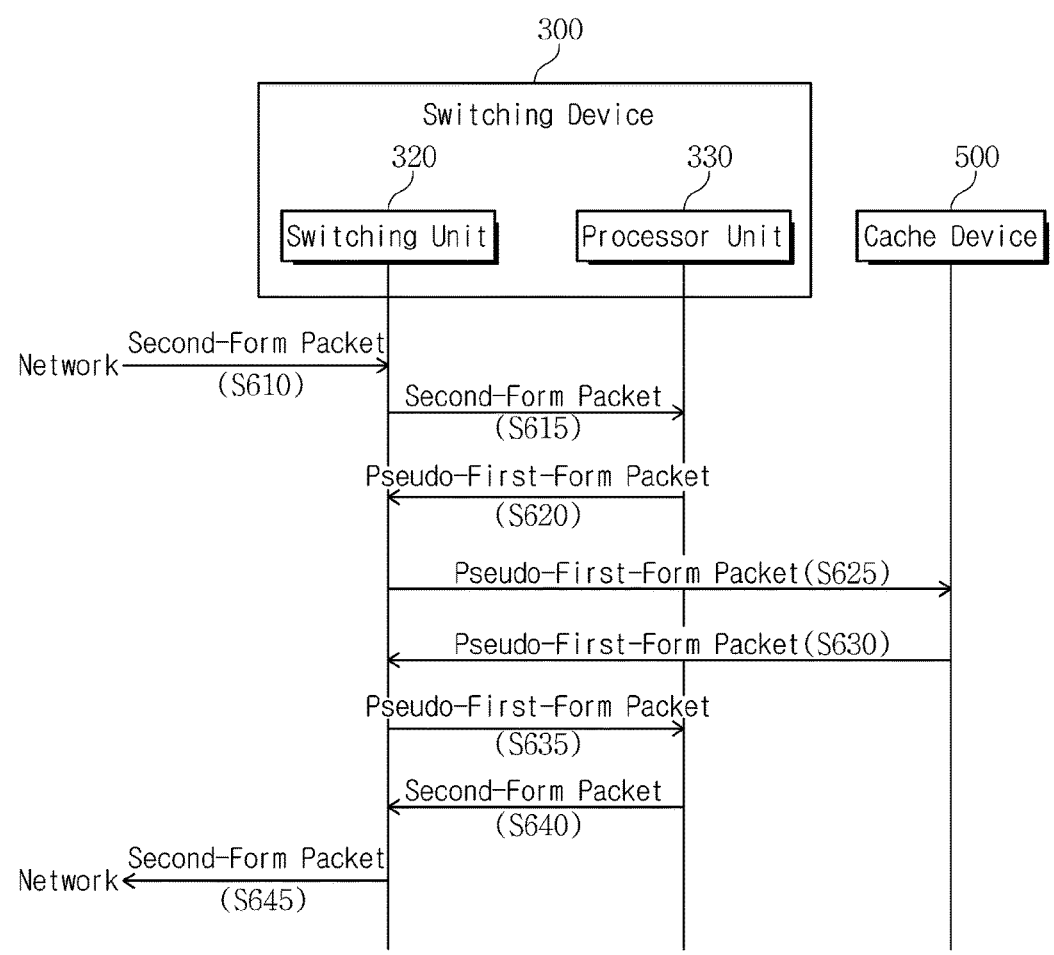
FIG. 6 is a flowchart of a data processing method of a switching device according to exemplary embodiments of the present disclosure.

FIG. 6 is a flowchart of a data processing method of a switching device according to exemplary embodiment of the present disclosure.

Referring to FIGS. 3 and 6, in operation S610, the switching unit 320 of the switching device 300 receives a second-form packet from a network through an interface unit 310. Then, in operation S615, the switching unit 320 inputs the second-form packet to the processor unit 330.

When the second-form packet is input, the processor unit 330 converts the second-form packet into a pseudo-first-form packet. At this time, the processor unit 330 generates the pseudo-first-form packet by attaching a second-form header to an end portion of a first-form packet. After that, in operation S620, the processor unit 330 outputs the pseudo-first-form packet to the switching unit 320.

The second-form header has a variable length. Therefore, the switching unit 320 recognizes the second-form header (or a second-form packet) through some field values in a leading portion of the second-form header. However, the switching unit 320 does not know the total length of the second-form header. Therefore, the switching unit 320 does not recognize a first-form header attached behind the second-form header. For example, assuming that the second-form header is a tunneling header (an outer IP header, a UDP header, and a GTP header) and the first-form header is a TCP/IP header, the switching unit 320 recognizes only the type of the second-form header due to the variable length of the GTP header but does not recognize the position of the TCP/IP header. However, the pseudo-first-form packet has a TCP/IP header at the beginning portion thereof. Therefore, the switching unit 320 recognizes a field value in the header of the packet. In other words, the switching unit 320 determines whether or not the packet is a packet processable by the cache device 500. For example, from a port number (e.g., port 80) of a TCP header, whether the cache device 500 recognizes the corresponding packet is determined. Accordingly, in operation S625, the switching unit 320 transmits the pseudo-first-form packet to the cache device 500 through the interface unit 310.

The cache device 500 receiving the pseudo-first-form packet performs necessary processing on the pseudo-first-form packet. At this time, since the pseudo-first-form packet has the same leading portion as the first-form packet, the cache device 500 processes the pseudo-first-form packet in the same way as a general first-form packet. Such processing includes a process in which the control module 530 of the cache device 500 copies content in the packet and stores the content in the storage module 520. In operation S630, the cache device 500 transmits the pseudo-first-form packet back to the switching device 300.

When the pseudo-first-form packet is received from the cache device 500 through the interface unit 310, the switching unit 320 inputs the pseudo-first-form packet to the processor unit 330 again in operation S635.

When the pseudo-first-form packet is input, the processor unit 330 processes the pseudo-first-form packet to restore the second-form packet. At this time, the processor unit 330 recognizes that the input packet is a pseudo-first-form packet through the second-form header attached to a rear portion of the pseudo-first-form packet, and restores the pseudo-first-form packet to the second-form packet. After that, in operation S640, the processor unit 330 outputs the restored second-form packet.

In operation S645, the switching unit 320 receiving the second-form packet from the processor unit 330 transmits the second-form packet to a network through an interface unit 310.

Figure 7:
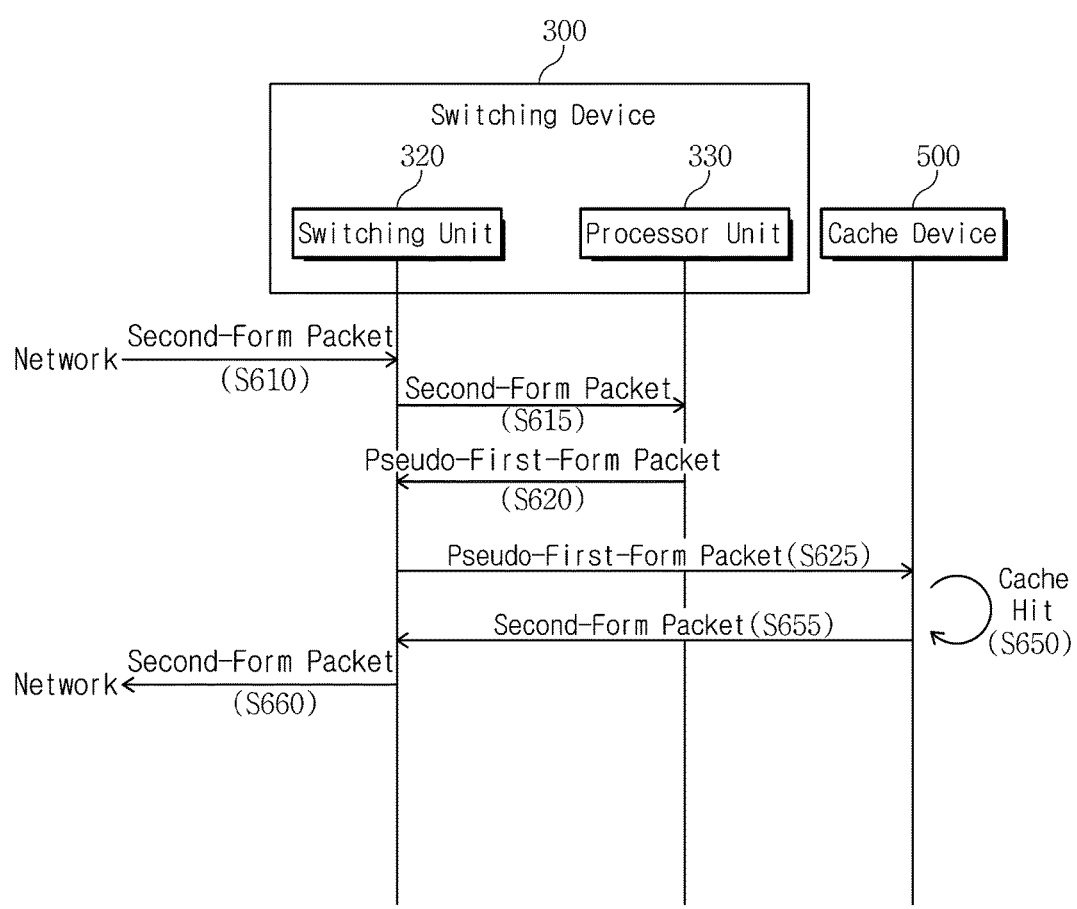
FIG. 7 is a flowchart of a data processing method of a switching device according to exemplary embodiments of the present disclosure.

FIG. 7 is a flowchart of a data processing method of a switching device according to exemplary embodiments of the present disclosure.

Referring to FIGS. 3 and 7, in operation S630, the switching unit 320 of the switching device 300 receives a second-form packet from a network through an interface unit 310. Here, it is assumed that the received second-form packet is a content request message transmitted from the UE 100 to the content server 800.

In operation S615, the switching unit 320 receiving the second-form packet inputs the second-form packet to the processor unit 330.

When the second-form packet is input, the processor unit 330 converts the second-form packet into a pseudo-first-form packet. At this time, the processor unit 330 generates the pseudo-first-form packet by attaching a second-form header behind a first-form packet (i.e., attaching a second-form header to an end portion of a first-form packet). After that, in operation S620, the processor unit 330 outputs the pseudo-first-form packet to the switching unit 320.

In operation S625, the switching unit 320 transfers the pseudo-first-form packet received from the processor unit 330 to the cache device 500 through the interface unit 310.

The cache device 500 receiving the pseudo-first-form packet performs necessary processing on the pseudo-first-form packet. At this time, since the pseudo-first-form packet has the same leading portion as the first-form packet, the cache device 500 processes the pseudo-first-form packet in the same way as a first-form packet. Meanwhile, when the received pseudo-first-form packet is a content request message, the cache device 500 determines whether or not the cache device 500 stores requested content (whether or not a cache hit occurs) in operation S650.

When it is determined that the cache device 500 stores the requested content, the cache device 500 retrieves the stored content to generate a second-form packet to be transmitted to the UE 100, and outputs the generated second-form packet to the switching unit 320 in operation S655.

When the second-form packet is received from the cache device 500, the switching unit 320 causes the received second-form packet to bypass the switching unit 320, as it is, in operation S660.

Figure 8:
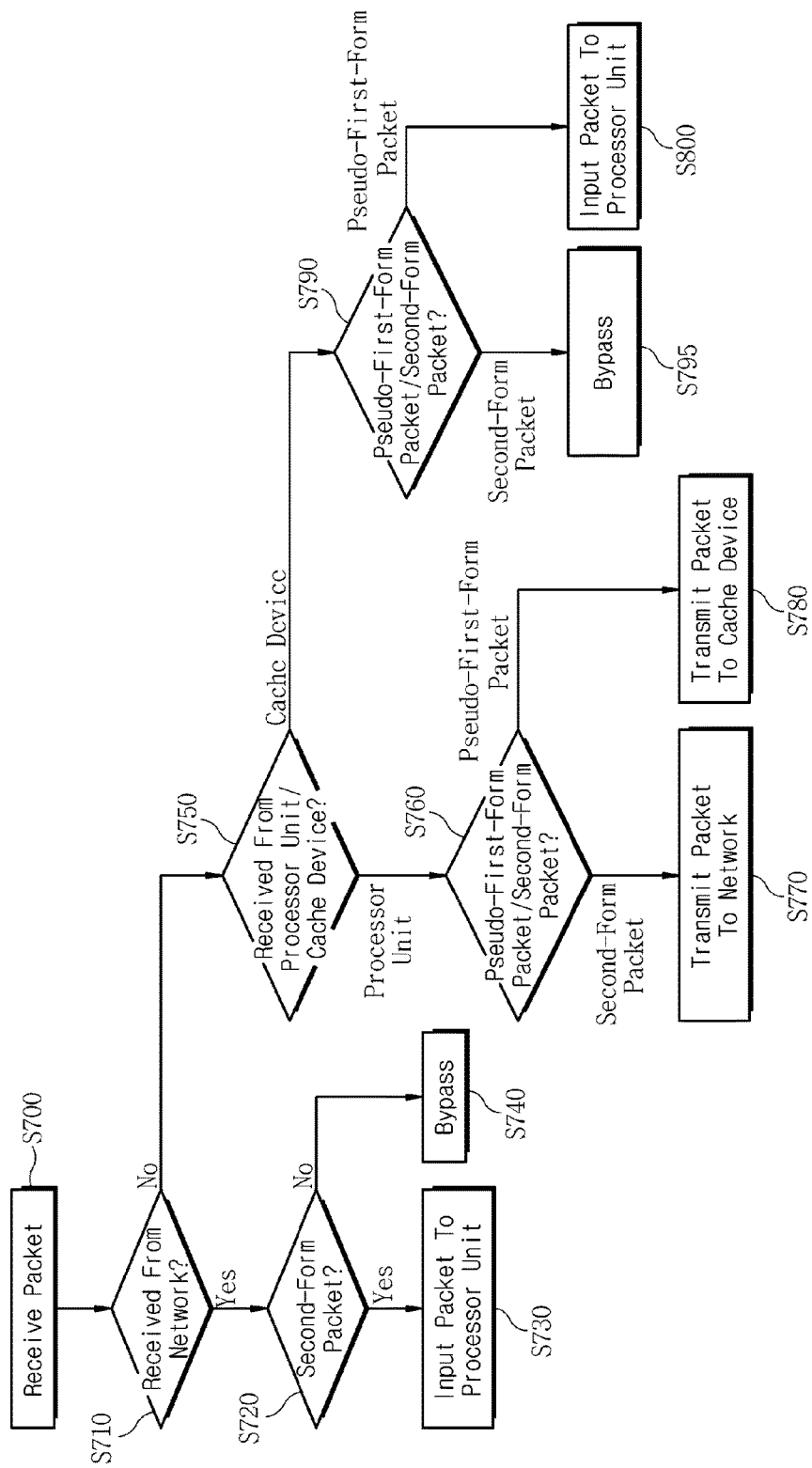
FIG. 8 is a flowchart of a data processing method of a switching unit according to exemplary embodiments of the present disclosure.

Therefore, the second-form packet that the cache device 500 intends to transmit to the UE 100 is transmitted to the UE 100 through a network. FIG. 8 is a flowchart of a data processing method of a switching unit according to exemplary embodiments of the present disclosure.

Referring to FIGS. 3 and 8, in operation S700, the switching unit 320 receives a packet. At this time, processing of the packet varies according to which one of a network (a downlink or an uplink), the processor unit 330, and the cache device 500 the packet has been received from.

First, when it is determined in operation S710 that the received (in operation S700) packet has been received from a network, the switching unit 320 performs operations S720 to S740. Therefore, in operation S720, the switching unit 320 determines whether or not the received packet is a second-form packet. A second-form header has a variable length, and the switching unit 320 does not process the variable length of the second-form header. However, the switching unit 320 determines whether or not a packet is a second-form packet through a field value in a leading portion of a second-form header. When it is determined in operation S720 that the received packet is a second-form packet, the switching unit 320 inputs the packet to the processor unit 330 in operation S730. On the other hand, when it is determined in operation S720 that the received packet is not a second-form packet, the switching unit 320 causes the packet to pass through the switching unit 320, without changes, and to be transmitted to a network in operation S740. More specifically, the switching unit 320 transfers the packet to a downlink when the packet has been received from an uplink, and transfers the packet to an uplink when the packet has been received from a downlink.

Meanwhile, in operation S750, the switching unit 320 determines whether the received (in operation S700) packet is a packet having been received from the processor unit 330 or the cache device 500.

When it is determined in operation S750 that the received packet is a packet having been received from the processor unit 330, the switching unit 320 determines whether the packet is a pseudo-first-form packet or a second-form packet in operation S760.

When it is determined in operation S760 that the packet is a second-form packet, the packet is a packet which has been processed by the cache device 500 and then restored to the original form. Therefore, in operation S770, the switching unit 320 transmits the packet (second-form packet) to a network. In other words, the switching unit 320 transfers the packet to a downlink when the packet is a packet having been received from an uplink before being processed by the cache device 500. Also, the switching unit 320 transfers the packet to an uplink when the packet is a packet having been received from a downlink before being processed by the cache device 500.

On the other hand, when it is determined in operation S760 that the packet is a pseudo-first-form packet, the switching unit 320 transmits the packet (pseudo-first-form packet) to the cache device 500 in operation S780. Here, the switching unit 320 does not recognize a beginning position of a first-form header due to the variable length of a second-form header. However, the pseudo-first-form packet has a first-form header at the beginning portion thereof, and thus, the switching unit 320 can recognize a field value in the first-form header of the packet. Therefore, the switching unit 320 may determine that the packet is a packet process sable by the cache device 500. The first-form header is positioned at a leading portion of the pseudo-first-form packet, and a TCP header is included in the first-form header. Therefore, the switching unit 320 determines that the packet (i.e., pseudo-first-form packet) is a packet processable by the cache device 500 through the TCP header. For example, from a port number (e.g., port 80) of the TCP header, the switching unit 320 determines whether or not the cache device 500 can recognize the packet. After the determination, the switching unit 320 transmits the packet to the cache device 500.

Meanwhile, when the switching unit 320 receives the packet from the cache device 500, the switching unit 320 determines whether the packet is a pseudo-first-form packet or a second-form packet in operation S790.

When it is determined in operation S790 that the packet is a second-form packet, the packet is a packet which has been generated by the cache device 500 and is transmitted to the UE 100. Therefore, in operation S795, the switching unit 320 causes the packet (second-form packet) to pass through the switching unit 320, without changes, and to be transmitted to a network. Accordingly, the second-form packet transmitted from the cache device 500 is transmitted to the UE through the network.

On the other hand, when it is determined in operation S790 that the packet is a pseudo-first-form packet, the packet is a packet which has been transmitted from the switching unit 320 to the cache device 500, processed by the cache device 500, and then transferred back to the switching unit 320. In this case, in operation S800, the switching unit 320 transfers the packet (pseudo-first-form packet) to the processor unit 330 to restore the packet to the original form.

Figure 9:
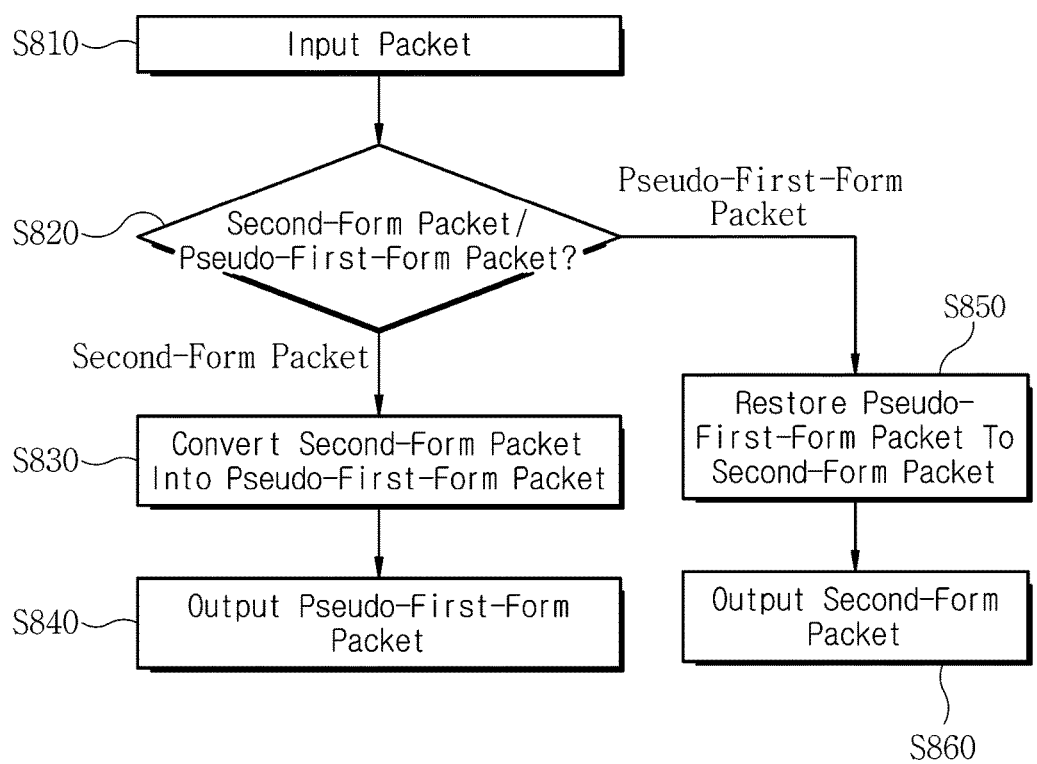
FIG. 9 is a flowchart of a method for data processing of a processor unit according to exemplary embodiments of the present disclosure.

FIG. 9 is a flowchart of a method for data processing of a processor unit according to exemplary embodiments of the present disclosure.

Referring to FIG. 9, in operation S810, a packet is input from the switching unit 320 to the processor unit 330. Then, in operation S820, the processor unit 330 determines whether the input packet is a second-form packet or a pseudo-first-form packet. Accordingly, the processor unit 330 performs operation S830 when the input packet is a second-form packet, and performs operation S850 when the input packet is a pseudo-first-form packet.

When the input packet is a second-form packet, the processor unit 330 converts the second-form packet into a pseudo-first-form packet in operation S830. For example, it is assumed that a second-form header is a header for tunneling. The header for tunneling includes a GTP header, which has a variable length. Therefore, the processor unit 330 identifies the length of the second-form header by recognizing the variable length of the GTP header. After that, the processor unit 330 attaches the second-form header behind a first-form packet. In this way, the second-form packet is converted into a pseudo-first-form packet. After that, in operation S840, the processor unit 330 outputs the pseudo-first-form packet.

Meanwhile, when the input packet is a pseudo-first-form packet, the processor unit 330 recovers the pseudo-first-form packet to the second-form packet in operation S850. At this time, from a second-form header attached behind the input pseudo-first-form packet, the processor unit 330 recognizes that the input packet is a pseudo-first-form packet. Then, the processor unit 330 attaches the second-form header in front of a first-form packet to recover a second-form packet. After that, in operation 860, the processor unit 330 outputs the second-form packet.

As described above, various embodiments of the present disclosure provide modification of an original packet input to a cache device into a packet of a form recognizable by the cache device without damaging information of the original packet. Accordingly, the cache device is able to be caused to perform necessary processing on the packet. In addition, a switching device is able to restore the packet of a form recognizable by the cache device to a packet of a form used in a network. Accordingly, the switching device maintains compatibility with other entities in the network.

As described above, the processor unit 330 is able to modify an input original packet into a packet of a form recognizable by a cache device without damaging information of the original packet. Accordingly, a cache device is able to perform necessary processing on the packet. Such a method for data processing according to embodiments of the present disclosure can be implemented as a computer-readable code in a non-transitory computer-readable recording medium. The non-transitory computer-readable recording medium separately includes program instructions, data files, data structures, etc. or include a combination thereof. The non-transitory computer-readable recording medium includes all types of recording devices in which data readable by a computer system is stored. Examples of the non-transitory computer-readable recording medium include magnetic media, such as a hard disk, a floppy disk, and a magnetic tape, optical media, such as a compact disk read only memory (CD-ROM) and a digital video disk (DVD), magneto-optical media, such as a floptical disk, and hardware devices, such as a ROM, a random access memory (RAM), and a flash memory, that are specially configured to store and execute program instructions.

In addition, the non-transitory computer-readable recording medium is distributed in computer systems connected via a network such that computer-readable codes can be stored and executed in a distributed manner. Functional programs, codes, and code segments used to implement one or more embodiments of the present disclosure can be deduced by programmers in the technical field to which the present disclosure pertains.

Some embodiments for exemplifying the technical spirit of the present disclosure have been described and shown above, but the present disclosure is not limited to shown and described constitutions and effects. Those of ordinary skill in the art appreciate that various changes and modifications of some embodiments of the present disclosure can be made without departing from the spirit and scope of the claimed invention. Specific terms used in this disclosure and drawings are used for illustrative purposes and not to be considered as limitations of the present disclosure. Therefore, it is to be understood that all suitable changes, modifications, and equivalents fall within the scope of the claimed invention.

What is claimed is:

1. A switching device for data processing, said switching device comprising:
   a processor unit configured to generate a pseudo-first-form packet by attaching a second-form header to an end portion of a first-form packet when a second-form packet is input, the second-form packet including the first-form packet encapsulated with the second-form header; and
   a switching unit configured to
      transfer the second-form packet to the processor unit when the second-form packet is input from a network, and
      transfer the pseudo-first-form packet generated by the processor unit to a cache device such that the cache device processes the pseudo-first-form packet,
   wherein when the second-form packet is input from the cache device, the switching unit is configured to cause the input second-form packet to bypass the switching unit.

2. The switching device of claim 1, wherein when the pseudo-first-form packet is input from the cache device, the processor unit is configured to
   process the pseudo-first-form packet to restore the second-form packet, and
   output the second-form packet.

3. The switching device of claim 1, wherein the switching device is located between a base station (BS) device and a core device, and
   the second-form packet is a packet transmitted and received between the BS device and the core device.

4. The switching device of claim 1, wherein
   the first-form packet is a transmission control protocol/Internet protocol (TCP/IP) packet,
   the second-form packet is a packet radio service tunneling protocol (GTP) packet, and
   the switching unit is configured to find a port number in a TCP header of the pseudo-first-form packet, and transfer the pseudo-first-form packet to the cache device when the pseudo-first-form packet is a packet recognizable by the cache device.

5. The switching device of claim 2, wherein
   when the pseudo-first-form packet is input from the cache device, the processor unit is configured to process the pseudo-first-form packet to restore the second-form packet,
      by moving the second-form header included in the pseudo-first-form packet from the end portion to a front portion of the pseudo-first-form packet.

6. A switching device for data processing, said switching device comprising:
   a processor unit configured to generate a pseudo-first-form packet by attaching a second-form header to an end portion of a first-form packet when a second-form packet is input, the second-form packet including the first-form packet encapsulated with the second-form header; and
   a switching unit configured to
      transfer the second-form packet to the processor unit when the second-form packet is input from a network, and
      transfer the pseudo-first-form packet generated by the processor unit to a cache device such that the cache device processes the pseudo-first-form packet,
   wherein the first-form-packet comprises a field of a first-form header and a field of a payload in the recited order, the second-form-packet comprises a field of the second-form header, a field of the first-form header and a field of the payload in the recited order, and the pseudo-first-form-packet comprises a field of the first-form header, a field of the payload and a field of the second-form header in the recited order.

7. A method performed by a switching device for data processing, the switching device comprising a processor unit and a switching unit, the method comprising:

generating a pseudo-first-form packet by attaching a second-form header to an end portion of a first-form packet when a second-form packet is input, the second-form packet including the first-form packet encapsulated with the second-form header;

transferring the second-form packet to the processor unit when the second-form packet is input; and transferring the pseudo-first-form packet to a cache device such that the cache device processes the pseudo-first-form packet, wherein the method further comprising:

when the second-form packet is input from the cache device, causing the input second-form packet to bypass the switching unit.

8. The method of claim 7, further comprising:

when the pseudo-first-form packet is received from the cache device, processing the pseudo-first-form packet to restore the second-form packet, and transmitting the second-form packet.

9. The method of claim 7, wherein the first-form packet is a transmission control protocol/Internet protocol (TCP/IP) packet, the second-form packet is a packet radio service tunneling protocol (GTP) packet, and the switching unit finds a port number in a TCP header of the pseudo-first-form packet, and transfers the pseudo-first-form packet to the cache device when the pseudo-first-form packet is a packet recognizable by the cache device.

10. The method of claim 8, wherein the processing of the pseudo-first-form packet to restore the second-form packet comprises moving the second-form header included in the pseudo-first-form packet from the end portion to a front portion of the pseudo-first-form packet.

11. The method of claim 7, wherein the first-form-packet comprises a field of a first-form header and a field of a payload in the recited order, the second-form-packet comprises a field of the second-form-header, a field of the first-form header and a field of the payload in the recited order, and the pseudo-first-form-packet comprises a field of the first-form header, a field of the payload and a field of the second-form-header in the recited order.

* * * * *